(12) United States Patent
Shimizu et al.

(10) Patent No.: US 7,021,158 B2
(45) Date of Patent: Apr. 4, 2006

(54) SURFACE-PRESSURE DISTRIBUTION SENSOR AND METHOD FOR CONTROLLING OPERATION THEREOF

(75) Inventors: Makoto Shimizu, Ogaki (JP); Masashi Mitsui, Gifu (JP); Yusuke Tsutsui, Gifu (JP); Takeo Yoshimura, Edgewater, NJ (US)

(73) Assignee: Sanyo Electric Co., Ltd., Osaka (JP)

( * ) Notice: Subject to any disclaimer, the term of this patent is extended or adjusted under 35 U.S.C. 154(b) by 23 days.

(21) Appl. No.: 10/665,378

(22) Filed: Sep. 22, 2003

(65) Prior Publication Data
US 2004/0130335 A1 Jul. 8, 2004

(30) Foreign Application Priority Data
Sep. 20, 2002 (JP) ............................. 2002-275500

(51) Int. Cl.
*G01D 7/00* (2006.01)

(52) U.S. Cl. ............................................. 73/862.041

(58) Field of Classification Search ........... 73/862.041, 73/862.624, 862.046, 862.474, 862.626, 73/718; 438/758
See application file for complete search history.

(56) References Cited

U.S. PATENT DOCUMENTS

| | | | | |
|---|---|---|---|---|
| 5,325,442 A | * | 6/1994 | Knapp | ........................ 382/124 |
| 5,952,588 A | * | 9/1999 | Young | .................... 73/862.626 |
| 6,150,283 A | * | 11/2000 | Ishiguro | ..................... 438/758 |
| 6,234,031 B1 | * | 5/2001 | Suga | ..................... 73/862.474 |
| 6,242,892 B1 | | 6/2001 | Arnaud et al. | |
| 6,370,965 B1 | * | 4/2002 | Knapp | .................... 73/862.046 |
| 6,688,186 B1 | * | 2/2004 | Chae | ..................... 73/862.624 |

FOREIGN PATENT DOCUMENTS

| | | |
|---|---|---|
| CN | 1237283 A | 12/1999 |
| JP | 06-249700 | 9/1994 |
| JP | 11-23385 A | 1/1999 |
| WO | WO-99/12245 A3 | 3/1999 |

* cited by examiner

*Primary Examiner*—Max Noori
*Assistant Examiner*—Octavia Davis
(74) *Attorney, Agent, or Firm*—Morrison & Foerster LLP

(57) ABSTRACT

A surface-pressure distribution sensor includes a plurality of unit detection elements placed in a sensor area of a substrate and a switch formed on the substrate. The sensor is configured to operate under an operation mode in which the unit detection elements are sequentially selected or a standby mode in which the unit detection elements are not selected. The sensor is also configured to alternate between the two modes. The switch is configured change the standby mode to the operation mode when the switch is operated on.

7 Claims, 10 Drawing Sheets

Prior Art

FIG.10B

Prior Art

FIG.10C

Prior Art

SURFACE-PRESSURE DISTRIBUTION SENSOR AND METHOD FOR CONTROLLING OPERATION THEREOF

BACKGROUND OF THE INVENTION

1. Field of the Invention

This invention relates to a surface-pressure distribution sensor and a method for controlling the operation of the sensor and more particularly to a surface-pressure distribution sensor capable of reducing power consumption and a method for controlling the operation of the sensor.

2. Description of the Related Art

A surface-pressure distribution sensor that uses a flexible conductive film and a TFT (Thin Film Transistor) is known as a device for detecting a fine concavo-convex pattern like a fingerprint pattern (Japanese Patent Application Publication No. Hei 6-288845).

Figure 10A:
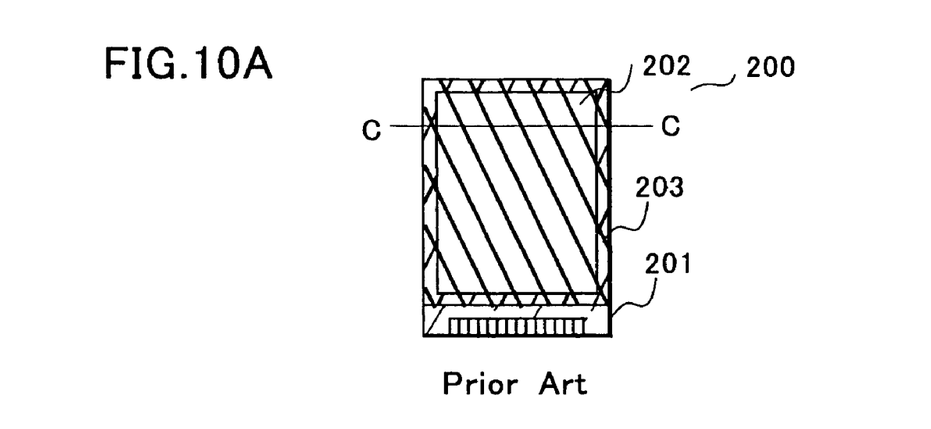
Figure 10B:
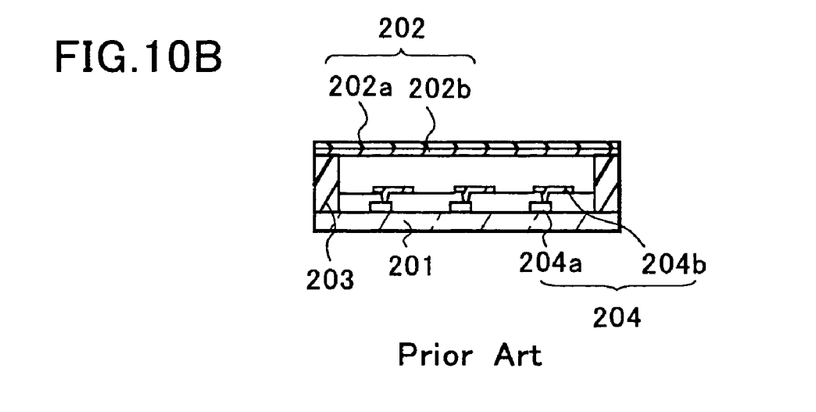
Figure 10C:
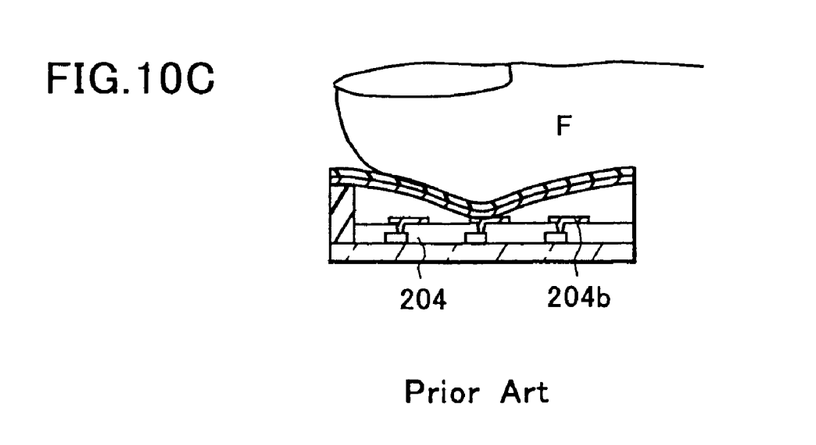
FIG. 10C is a sectional view under operation of a conventional sensor.

FIGS. 10A–10C show an example of an active matrix type surface-pressure distribution sensor for detecting a fingerprint pattern. FIG. 10A is a plan view, and FIGS. 10B and 10C are sectional views along line C—C of FIG. 10A.

A conventional surface-pressure distribution sensor 200 includes a glass or ceramic board 201, on which a plurality of TFTs 204a serving as unit detection elements are disposed, and an counter electrode film 202.

The unit detection element 204 includes the TFT 204a and a contact electrode connected to the TFT 204a. The unit detection elements 204 are arranged in a matrix form on the board 201 made of glass or the like. The active layer of the TFT forming the unit detection element 204 is an amorphous silicon film, and the contact electrode 204b is made of ITO (Indium Tin Oxide).

The counter electrode film 202 is disposed to face the board 201 and has a conductive film 202b deposited on the back face (on the side of the TFT) of a flexible insulating film 202a.

The counter electrode film 202 is fixed by a sealing agent 203 applied to the periphery of the board 201 and is spaced apart from the board 201.

An example of a method for manufacturing the surface-pressure distribution sensor is as follows. After TFTs are formed on the board 201, a sealing agent 203 of low-temperature thermosetting resin is applied to the periphery of the board 201 in order to adhere the counter electrode film 202. Thereafter, the counter electrode film 202 of the board 201 is adhered thereon and is subjected to thermal treatment. As a result, the board 201 and the counter electrode film 202 are fixed together.

FIG. 10C shows an example of detecting a fingerprint pattern by use of this surface-pressure distribution sensor.

The entire electrode film 202 is pressed down by lightly pushing the surface-pressure distribution sensor 200 while placing a finger F thereon. However, since a difference in pressing force exists between a mountain part and a valley part of the fingerprint in minute scale, a contact electrode 204b of a unit detection element 204 disposed exactly under the mountain part or disposed in close vicinity of the mountain part comes into electric contact with the counter electrode film 202. However, the contact electrode 204b of the unit detection element 204 disposed exactly under the valley part of the fingerprint or disposed in the vicinity of the valley part does not come into electric contact with the counter electrode film 202. Thus, a signal of a portion where the electrode film 202 and the unit detection element 204 come into contact with each other is picked up to detect a fingerprint pattern.

As described above, in the conventional surface-pressure distribution sensor, a sensor area is scanned while always applying scanning signals from a drain wire and a gate wire. For example, a display device such as an LCD (liquid crystal display) needs to scan all the time for the purpose of displaying, whereas the surface-pressure distribution sensor used to detect fingerprints only has to operate at least when the fingerprints are detected. Additionally, the TFT is always kept driving because of the continuous scanning, thus causing fast deterioration of the TFT and hindering its life from being made longer.

SUMMARY OF THE INVENTION

The invention provides a surface-pressure distribution sensor including a plurality of unit detection elements disposed in a sensor area. The sensor is configured to operate under an operation mode for measuring a surface-pressure distribution or a standby mode with reduced power consumption and is configured to alternate between the two modes.

The invention also provides a surface-pressure distribution sensor that includes a plurality of unit detection elements disposed in a sensor area, and a switch disposed in the sensor area. The sensor is configured to operate under an operation mode in which the unit detection elements are sequentially selected or a standby mode in which the unit detection elements are not selected and is configured to alternate between the two modes. The switch is configured to change the standby mode to the operation mode when the switch is operated on.

The invention further provides a surface-pressure distribution sensor alternating between an operation mode and a standby mode. The sensor includes an insulating substrate, unit detection elements disposed on the insulating substrate in a matrix form, a flexible conductive film facing the unit detection elements, drain wires connected to corresponding terminals of the unit detection elements, and gate wires connected to corresponding terminals of the unit detection elements. The sensor also includes a horizontal scanning circuit selecting the drain wires sequentially, a vertical scanning circuit sending a scanning signal to the gate wires sequentially, a sensor control circuit connected to the horizontal scanning circuit and the vertical scanning circuit; and a sensor actuation signal wire connected to the sensor control circuit. The sensor control circuit is configured to receive a sensor actuation signal through the sensor actuation signal wire and configured to switch off the unit detection elements operational under the operation mode and to switch on the unit detection elements not operational under the standby mode in response to the sensor actuation signal. The sensor may includes a switch disposed in a sensor area and configured to provide a sensor actuation signal to the sensor control circuit so that the unit detection elements not operational under the stand by mode are switched on so as to operate under the operation mode.

The invention provides a method for controlling a surface-pressure distribution sensor that includes a plurality of unit detection elements and a scanning circuit that selects the unit detection elements sequentially. The method includes suspending a selection operation of the scanning circuit, selecting at least one of the unit detection elements while suspending the selection operation of the scanning circuit, and resuming the selection operation of the scanning circuit in response to an output of the unit detection element that is selected while suspending the selection operation.

The invention also provides a method for controlling an operation of a surface-pressure distribution sensor that includes unit detection elements, a vertical scanning circuit, a horizontal scanning circuit, gate wires connecting the vertical scanning circuit and the unit detection elements, drain wires connecting the horizontal scanning circuit and the unit detection circuit, a sensor control circuit connected to the vertical and horizontal scanning circuits, and a flexible conductive film facing the unit detection elements. The method includes operating the vertical scanning circuit so that the gate wires are sequentially selected so as to supply a gate signal to the unit detection elements connected to the selected gate wire, operating the horizontal scanning circuit so that the drain wires are sequentially selected so as to determine whether a selected unit detection element is in contact with the flexible conductive film, suspending the operating of the vertical and horizontal scanning circuits by breaking connections between the sensor control circuit and the vertical and horizontal scanning circuits, and resuming in response to a sensor actuation signal the operating of the vertical and horizontal scanning circuits by restoring the connections between the sensor control circuit and the vertical and horizontal scanning circuits.

BRIEF DESCRIPTION OF THE DRAWINGS

FIG. 1A is a plan view.

FIG. 3A is a sectional view.

FIG. 4A is another plan view.

FIG. 6A is a plan view.

FIG. 7A is a schematic circuit view.

FIG. 9A is a plan view.

FIG. 10A is a plan view, FIG. 10B is a sectional view.

DETAILED DESCRIPTION OF THE INVENTION

Figure 1A:
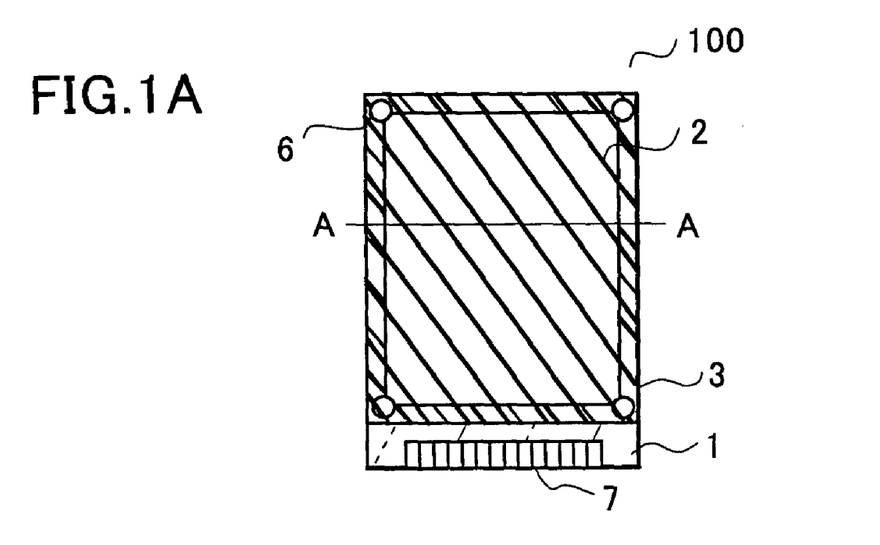
Figure 1B:
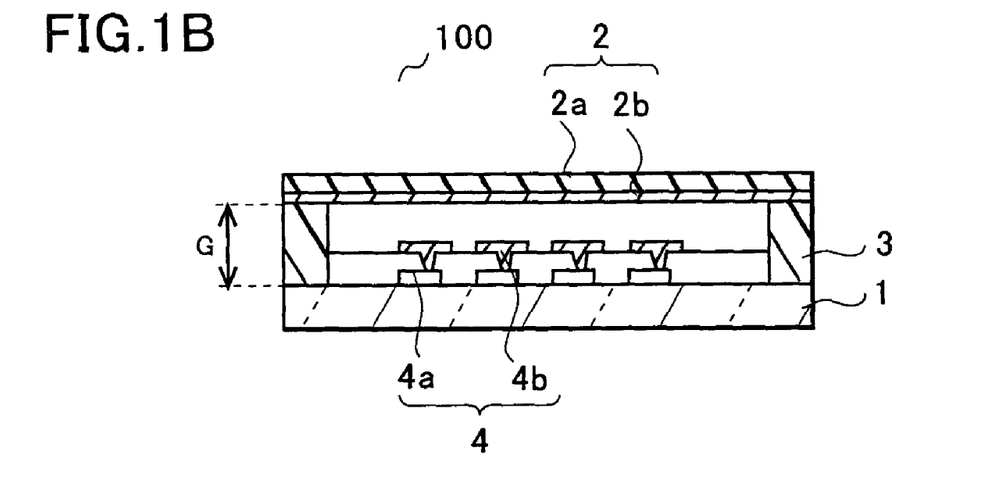
FIG. 1B is a sectional view of a sensor of a first embodiment of the invention.

A first embodiment of the invention will be described with reference to FIG. 1A to FIG. 5. FIGS. 1A and 1B show the structure of a surface-pressure distribution sensor. FIG. 1A is a plan view, and FIG. 1B is a sectional view along line A—A of FIG. 1A. As shown in the figures, the surface-pressure distribution sensor 100 includes a substrate 1 and an counter electrode film 2 of a flexible conductive film, which are attached together by a sealing agent 3.

The substrate 1 is an insulating substrate such as glass. A plurality of unit detection elements 4 are arranged in a matrix form inside the area enclosed by the sealing agent 3 on the substrate 1. Contacts 6 are disposed inside the sealing agent 3. Wires, not shown, that are connected to the unit detection elements 4 and that transmit various signals to be inputted to a gate signal wire 8, a drain signal wire 9, etc., are gathered at an outer connection terminal 7 at the side edge of the substrate 1 and are used to connect the substrate 1 to an external control circuit through an FPC (Flexible Print Circuit), which is not shown the figure.

The counter electrode film 2 has a structure where a conductive film 2b made of metal a such as gold is deposited on the backface (on the side of the TFT) of a flexible insulating film 2a made of PET (polyethylene terephthalate) or PEN (polyethylene naphthalate).

The sealing agent 3 is a thermosetting resin that can be hardened by heat while exhibiting a liquid state before being hardened.

The unit detection element 4 includes a TFT 4a used as a switching element and a contact electrode 4b connected thereto. The active layer of the TFT 4a is a silicon film, preferably, a polysilicon film. The contact electrode 4b is a conductive film formed on an insulating film covering the TFT 4a and is made of, e.g., ITO.

The contact 6 is provided to supply a GND potential to the electrode film 2, and includes an Al-made contact pad and a thermosetting contact resin having conductive particles and disposed on the contact pad.

Figure 2:
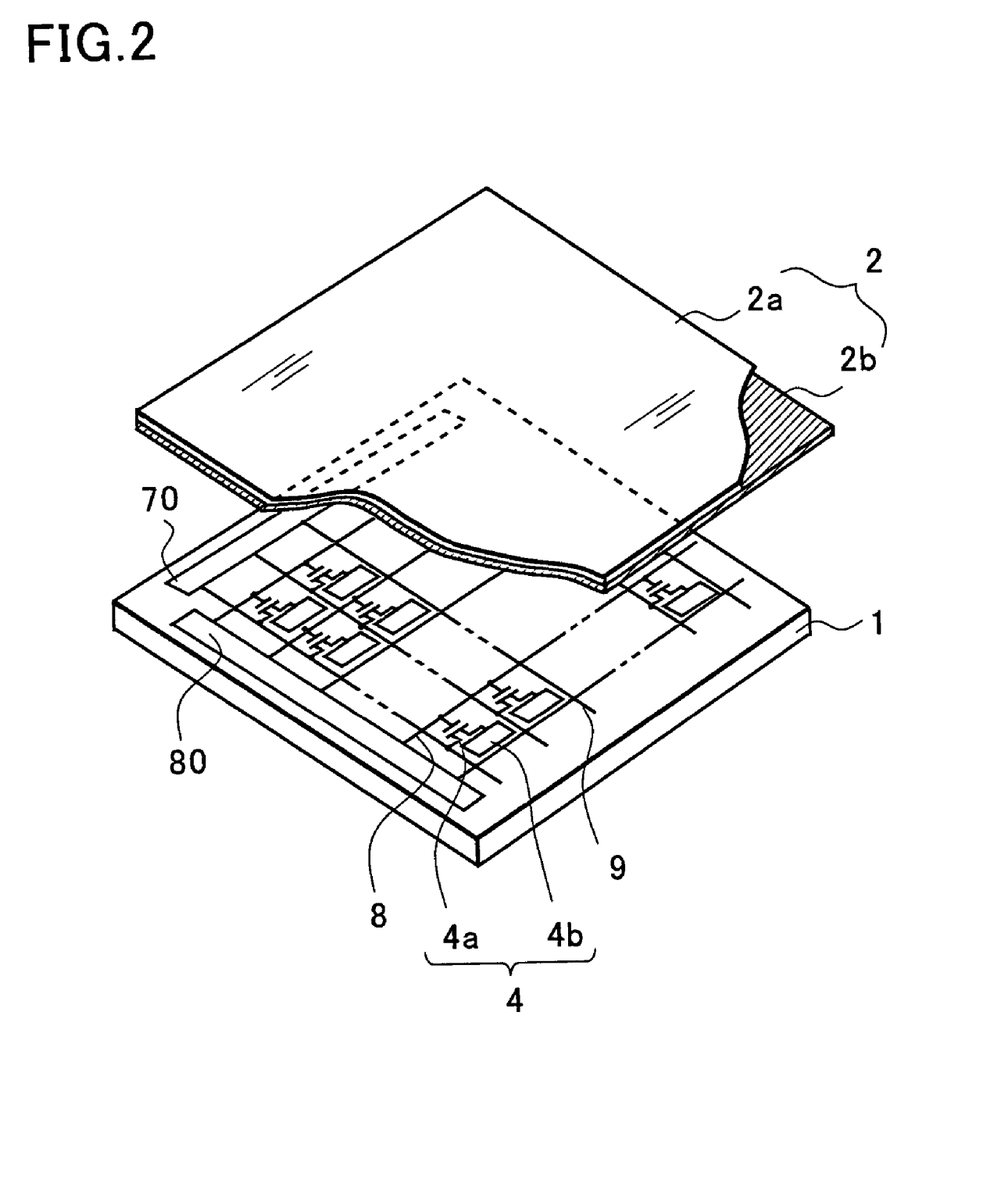
FIG. 2 is an exploded perspective view to of the sensor of FIG. 1A.

FIG. 2 is an exploded perspective view of the surface-pressure distribution sensor. As shown in FIG. 2, gate wires 8 and drain wires 9 are arranged in a matrix form on the substrate 1.

A gate signal and a scanning signal are applied to the gate wire 8 and the drain wire 9, respectively. The TFT 4a is disposed corresponding to the intersection between the gate wire 8 and the drain wire 9. The gate of the TFT 4a is connected to the gate wire 8, the drain terminal thereof is connected to the drain wire 9, and the source terminal thereof is connected to the contact electrode 4b. Wires, not shown, to transmit various signals to be inputted to the gate wire 8 or the drain wire 9 are gathered at the side edge of the substrate 1 and are connected to the outer connection terminal 7.

Figure 3A:
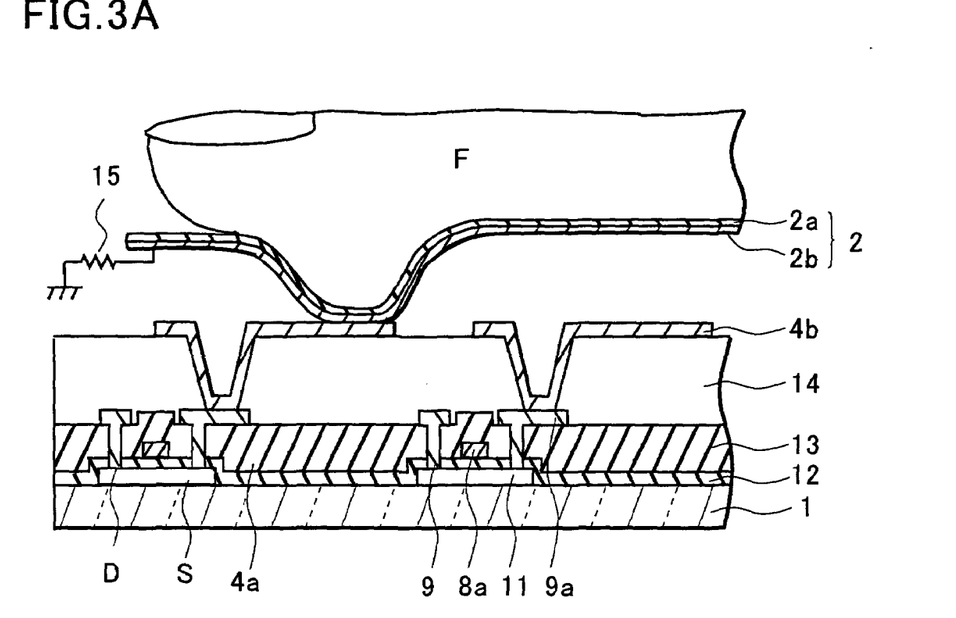
Figure 3B:
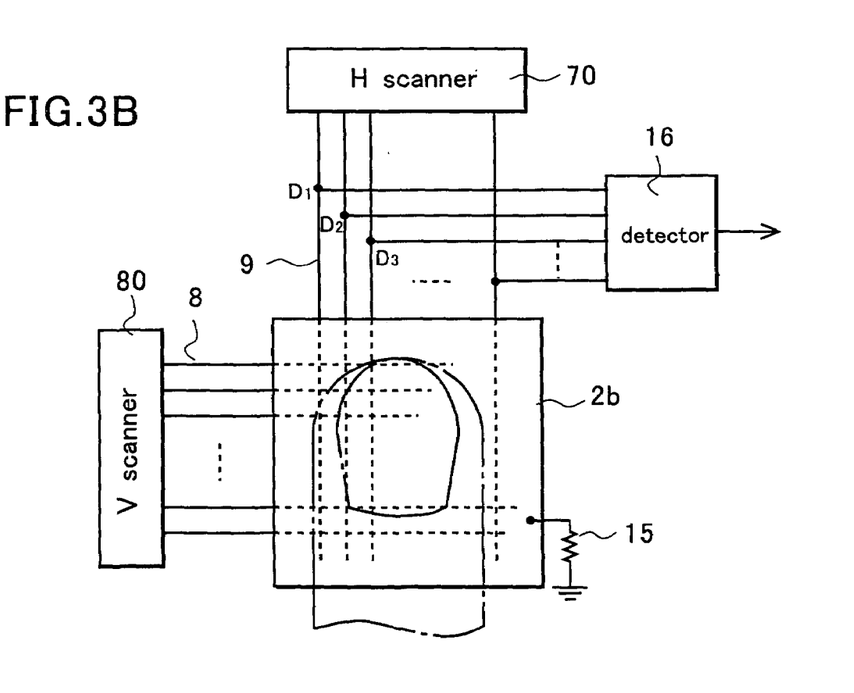
FIG. 3B is a schematic view of an operation of the sensor of FIG. 1A.

Referring next to FIGS. 3A and 3B, the operation of the surface-pressure distribution sensor 100 is described. FIG. 3A shows a state in which a finger F is placed on the surface-pressure distribution sensor 100, and FIG. 3B is a conceptual diagram of the circuit of the surface-pressure distribution sensor 100.

The TFT 4a of the unit detection element 4 includes an active layer 11 of a polysilicon layer on the substrate 1. A source region S and a drain region D are formed by introducing impurities according to a known method. A gate insulating film 12 is formed by covering the entire active layer 11, and a gate electrode 8a is formed thereon. The gate electrode 8a is formed integrally with the gate wire 8. An interlayer insulating film 13 is formed on the gate electrode 8a. The drain terminal D of the active layer 11 is connected to the drain wire 9 through a contact hole. The source terminal S is connected to an extraction electrode 9a. The extraction electrode 9a belongs to the same layer as the drain wire 9 and is made of, e.g., Al. A planarization film 14 is placed thereon, and thereby a rugged part of the lower layer is flattened. An ITO contact electrode 4b that comes into contact with the extraction electrode 9a through a contact hole is disposed on the planarization film 14.

When placing the finger F and lightly pushing on the surface-pressure distribution sensor 100, the entire electrode film 2 is pressed down as shown in FIG. 3A. Since a difference in pressing force exists between the mountain part and the valley part of a fingerprint at this time, the electrode film 2 exactly under the mountain part or in close vicinity thereof is greatly pressed down, but the electrode film 2 in close vicinity of the valley part is pressed down to a lesser extent. Therefore, the contact electrode 4b of the unit detection element 4 corresponding to the position of the mountain comes into contact with the conductive film 2b of the electrode film 2, whereas the contact electrode 4b of the unit detection element 4 corresponding to the position of the valley does not come into contact with the conductive film 2b.

The conductive film 2b of the counter electrode film 2 is grounded through a resistor 15. The drain wire 9 of the surface-pressure distribution sensor 100 is connected to a horizontal scanning circuit (hereinafter, referred to as H scanner 70), and the gate wire 8 is connected to a vertical scanning circuit (hereinafter, referred to as V scanner 80). Sequentially switched scanning signals are outputted at a predetermined timing from the V scanner 80 to the gate wire 8. Suppose that a gate signal with an electric potential ("H" level) is being applied to a certain gate wire 8. All of the TFTs 4a connected to the gate wire 8 to which the gate signal is applied reach an electrically conductive state (on-state). During that period, the scanning signals are sequentially switched and applied at a predetermined timing from the H scanner 70 to the drain wire 9.

When the counter electrode film 2 is bent by the mountain of the finger F and is brought into contact with the contact electrode 4b, the voltage decreases even if the voltage temporarily rises as a scanning signal, because an electric current flows out through the TFT 4a and the resistor 15. When the counter electrode film 2 is not in contact with the contact electrode 4b by the valley of the finger F, the voltage of the scanning signal is maintained. A surface-pressure distribution for one row can be measured by reading this as a voltage signal with a detector 16. The gate wires 8 to be selected are then sequentially switched, and the gate signal is applied. Thereafter, signals are read from all unit detection elements 4 of the surface-pressure distribution sensor 100, so that the surface-pressure distribution of the entire surface of the sensor can be measured.

The detector 16 may be a voltage measuring apparatus in connection by branching from the drain wire 9 or may be a current measuring apparatus inserted into the drain wire 9 in series. In this embodiment, the voltage measuring apparatus is employed because the voltage measuring apparatus may have a simpler circuit structure.

Figure 4A:
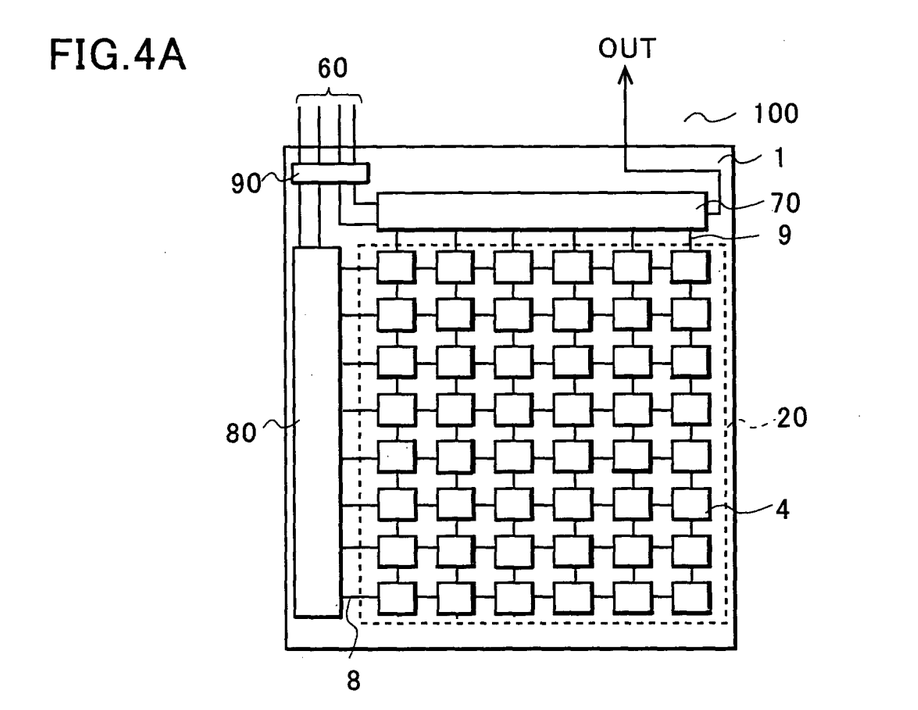
Figure 4B:
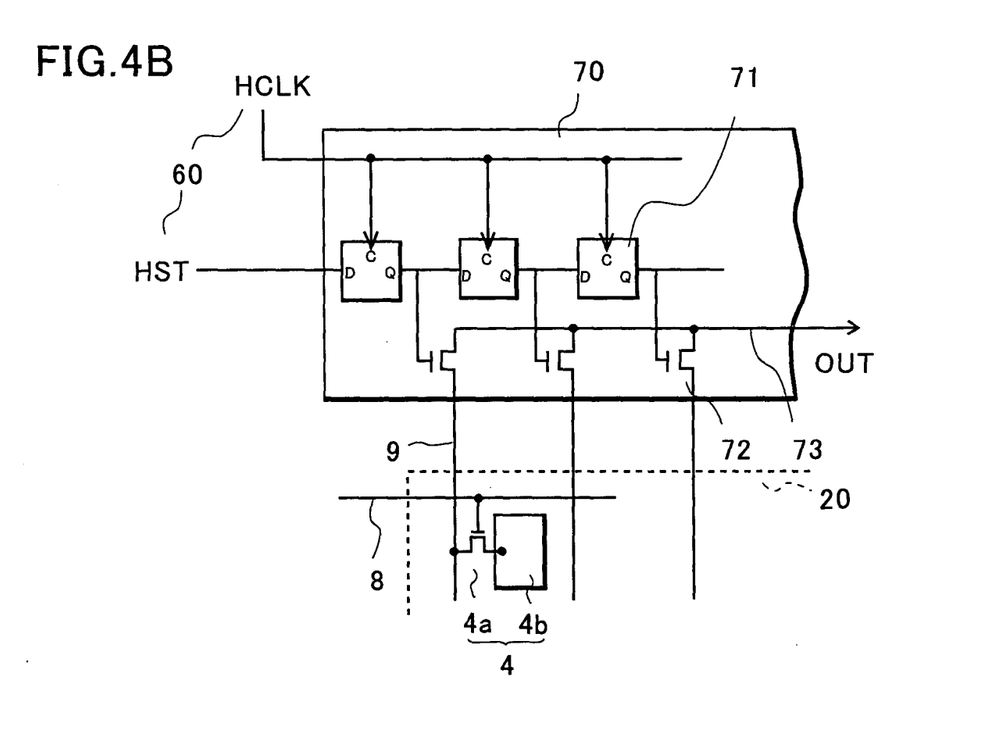
FIG. 4B is a schematic circuit view of the sensor of FIG. 1A.

FIGS. 4A and 4B are a schematic drawing that shows one example of a sensor area 20 of the surface-pressure distribution sensor 100 of this embodiment.

In the surface-pressure distribution sensor 100, a plurality of unit detection elements 4 of surface-pressure distribution are arranged in a matrix form on the insulating substrate 1, and the counter electrode film (not shown in FIGS. 4A and 4B) is disposed to face the unit detection elements 4. An area including the plurality of unit detection elements 4 and the counter electrode film 2, shown by a broken line, is a sensor area 20. A plurality of drain wires 9 that extend in a column direction and a plurality of gate wires 8 that extend in a row direction are further disposed on the substrate 1. The unit detection element 4 is disposed in correspondence with each intersection of the drain wires 9 and the gate wires 8. The unit detection element 4 includes the TFT 4a and the contact electrode 4b. The drain D of the TFT 4a is connected to the drain wire 9, the gate G thereof is connected to the gate wire 8, and the source S thereof is connected to the contact electrode 4b of the unit detection element 4.

At the side of the sensor area 20, the H scanner 70 that sequentially selects the drain wires 9 is disposed at the column side, and the V scanner 80 that sends a gate signal to the gate wires 8 is disposed at the row side.

Further, a sensor control circuit 90 that controls operation of the sensor area 20 is connected to the H scanner 70 and V scanner 80.

The surface-pressure distribution sensor 100 is connected to an external control circuit not shown. The external control circuit supplies various control signals to actuate the surface-pressure distribution sensor 100 or power-supply voltage VDD. The external control circuit is a normal CMOS circuit, which is operated by a low voltage of, e.g., 3V. The control signal outputted from the external control circuit also has an amplitude of 3V.

The V scanner 80 sequentially selects a predetermined gate wire 8 from among the plurality of gate wires 8 and applies a gate voltage VG so as to turn on the TFT 4a connected to the gate wire 8. The V scanner 80 selects a first gate wire 8 by a vertical start signal VST, and sequentially switches and selects a subsequent gate wire 8 in accordance with a vertical clock VCLK.

The H scanner 70 sequentially selects a drain wire 9 from among the plurality of drain wires 9 and supplies a signal to the TFT 4a. The H scanner 70 selects a first drain wire 9 by a horizontal start signal HST and sequentially switches and selects a subsequent drain wire 9 in accordance with a horizontal clock HCLK.

The vertical clock VCLK and the horizontal clock HCLK are generated by allowing a potential converting circuit to raise a low voltage clock of a 3-voltage amplitude outputted by the external control circuit.

FIG. 4B is a circuit diagram that shows the H scanner 70. The H scanner 70 includes a plurality of shift registers 71 and a plurality of drain-wire-selecting transistors 72, to the gate of which the output Q of the shift register 71 is connected. A horizontal clock HCLK in which a control signal supplied by the external control circuit has been raised by the potential converting circuit is inputted to the shift register 71 of each stage. The drain-wire-selecting transistor 72 has its gate connected to the output of the shift register 71. The drain of the drain-wire-selecting transistor 72 is connected to a data-reading wire 73, and the source of the drain-wire-selecting transistor 72 is connected to the drain wire 9.

A horizontal start signal HST is inputted to the shift register 71 of a first stage. When the signal HST is inputted, the output of the output terminal Q maintains "H" during one period of the horizontal clock HCLK in the shift register. One of the drain-wire-selecting transistors 72 is turned on by the output of the shift register 71, and the TFT 4a that forms the unit detection element 4 disposed at the intersection between the gate wire 8 and the drain wire 9 that has been selected reaches a driving state (sensing potential state). Since an electric current flows through the electrode film 2 that has been grounded if the contact electrode 4b of the TFT 4a comes into contact with the counter electrode film 2 at this time, a change in the electric current (or voltage) is outputted to the data-reading wire 73 so as to detect the mountain of the fingerprint.

The output of the shift register 71 is simultaneously inputted to the shift register 71 of a second stage. The output of the shift register 71 becomes "H" during one period of a subsequent horizontal clock HCLK, and the TFT 4a of the unit detection element 4 is turned on and reaches a sensing potential driving state. A subsequent shift register 71 is then turned on by the output of the shift register 71. The shift register 71 sequentially becomes "H" and sequentially selects the drain wire 9 in the same manner, thus driving all of the unit detection elements 4.

After all of the drain wires 9 for one row have been selected, the V scanner 80 supplies a gate voltage VG to a subsequent gate wire 8 during a subsequent period of the vertical clock VCLK. A horizontal start signal HST is then inputted again, and the output of the shift register 71 becomes "H".

The V scanner 80, not shown in FIG. 4B, also has a plurality of shift registers and operates in the same manner as the H scanner 70.

Figure 5:
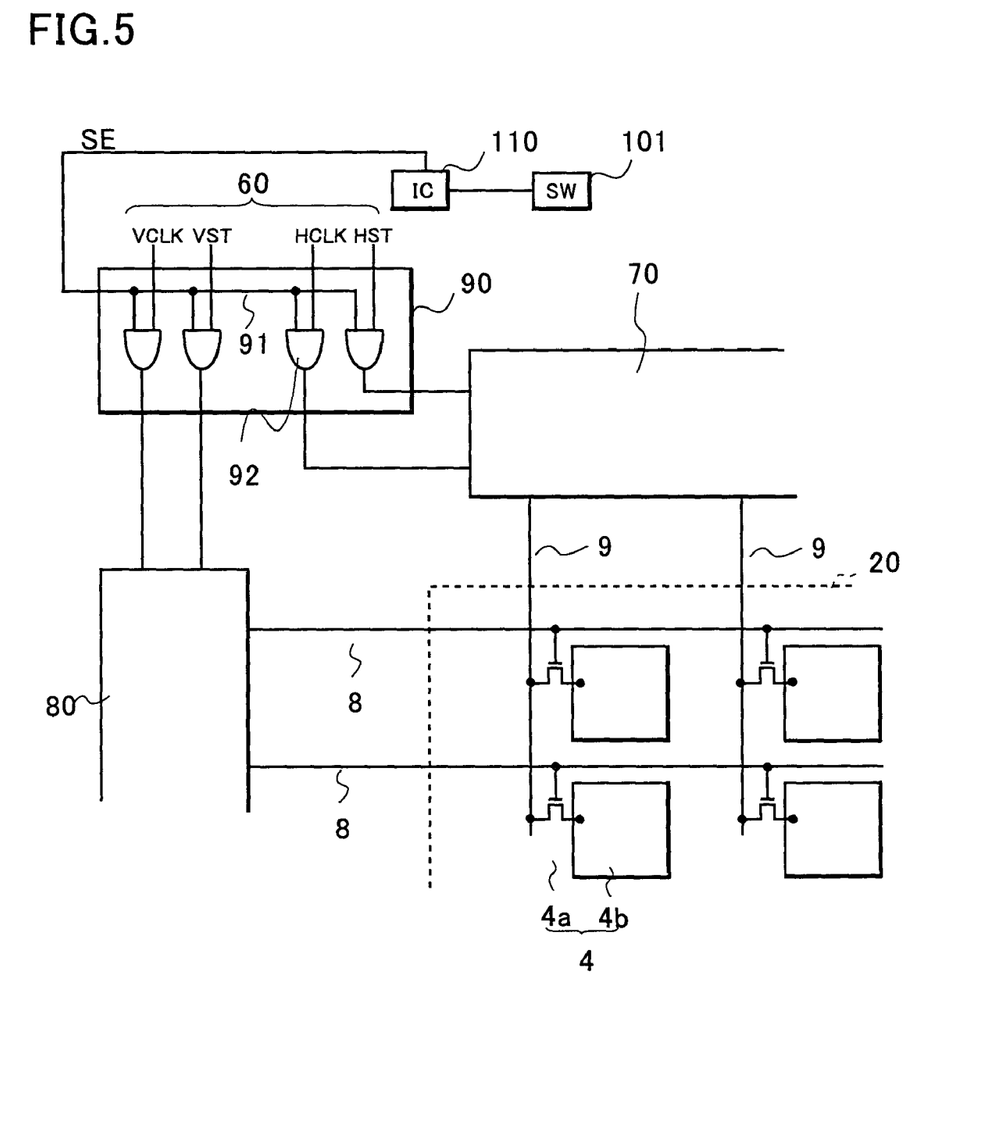
FIG. 5 is a schematic circuit view of the sensor of FIG. 1A.

In this embodiment, the sensor control circuit 90 that is connected to the H scanner 70 and V scanner 80 is provided as shown in FIG. 5. An example of the sensor control circuit 90 is an AND-circuit (hereinafter, referred to as AND gate) of the sensor actuation signal wire 91 and a control signal wire 60, to which the VCLK, VST, HCLK, and HST are applied. A sensor actuation signal SE that controls the start and standby of the sensor area 20 is applied to the sensor actuation signal wire 91 so as to open and close the AND gate 92. Switching control between the operation mode and the standby mode of the surface-pressure distribution sensor 2 is performed by controlling the H scanner 70 and the V scanner 80.

In the first embodiment, a sensor actuation signal SE is applied from the external IC 110 to the sensor actuation signal wire 91. For example, if the pressing (sensing) of the sensor area 20 is not caused during a fixed time period (three minutes, for example), the external IC 110 changes the sensor actuation signal SE to an "L" level in order to put the sensor area 20 under a standby mode. As a result, all the AND gates output the "L" level regardless of the level of the VCLK, VST, HCLK, and HST. In other words, the TFTs 4a of the sensor area 20 are put under the standby mode without being scanned, because the V scanner 80 and the H scanner 70 stop their operations. Accordingly, power consumption is reduced by stopping the selecting operation of the unit detection elements 4.

In order to change this mode to the operation mode again, the switch 101 disposed outside the sensor area 20 is pushed down, for example. When an external switch 101 is pushed down, an "H" level is outputted from the external IC 110 to the sensor actuation signal wire 91, and the output from the AND gate is performed in accordance with the VCLK, VST, HCLK, and HST. Therefore, the H scanner 70 and the V scanner 80 are actuated, and a sensing potential state is reached.

Herein, the ON and OFF of the sensor can be completely controlled by the external switch 101 alone without relying on a passage of time to turn off the TFTs. When the ON-switch is pushed down during operation of the sensor, a sensor actuation signal SE of "H" is applied. When the OFF-switch is pushed down after the sensing ends, a sensor actuation signal SE of "L" is applied.

Additionally, "H" and "L" may be alternately applied if only one switch is provided.

The sensor control circuit shown herein is one example. Therefore, this embodiment is not limited to the circuit shown herein if the circuit is configured to control the standby mode of each clock by a sensor actuation signal SE from the external circuit.

In addition to the switching of each scanner to the standby mode, the power supply to peripheral circuits, such as buffers, can also be stopped. For example, in a case in which a 3V signal supplied from the external circuit is raised inside the surface-pressure distribution sensor 2 so as to make each driving signal as described above, a greater effect of lower power consumption can be obtained by stopping a voltage raising circuit.

Next, a second embodiment of the invention will be described with reference to FIGS. 6A–7.

Figure 6A:
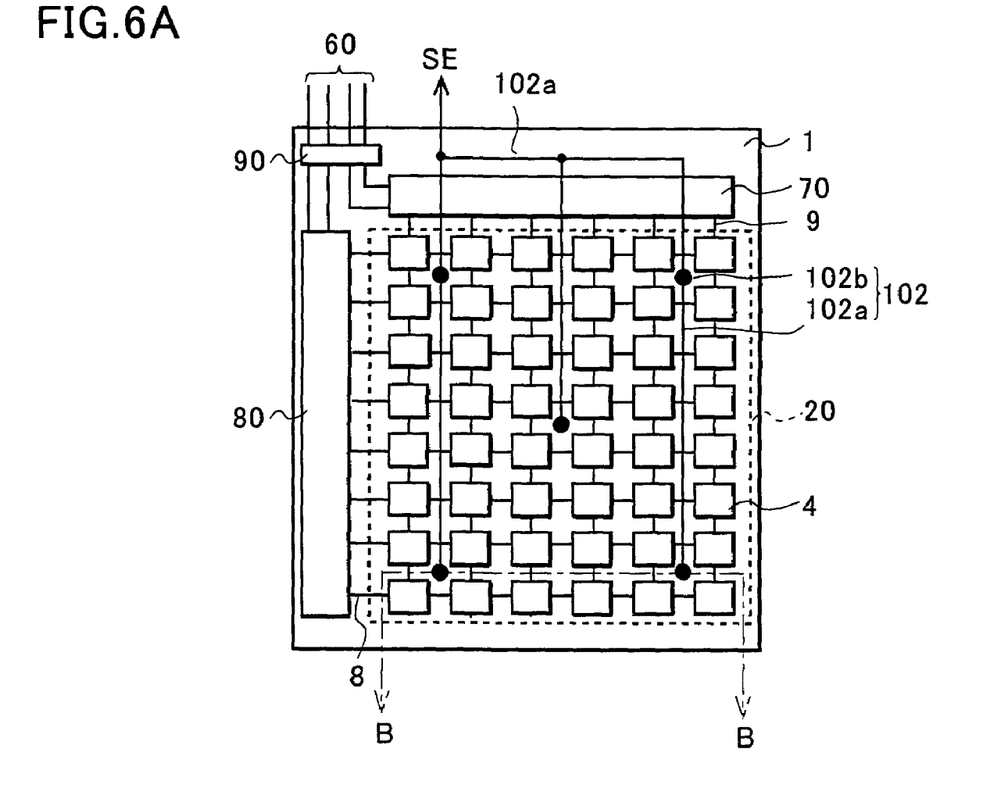
Figure 6B:
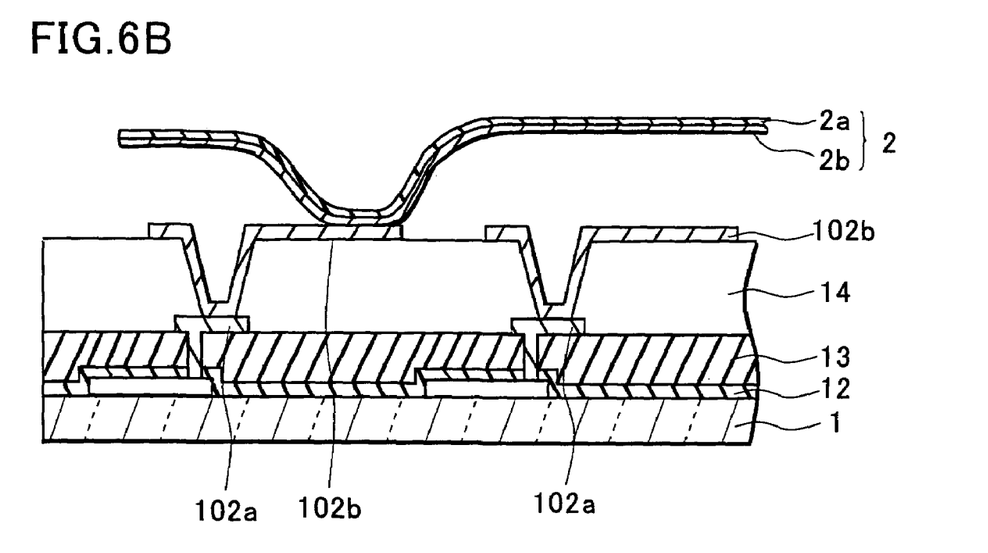
FIG. 6B is a sectional view of a sensor of a second embodiment of the invention.

FIG. 6A is a plan view, and FIG. 6B is a sectional view along line B—B of a switch 102 of FIG. 6A. The structure of the unit detection element 4 and the structure of the surface-pressure distribution sensor 100 are the same as those of the first embodiment, and the structures of the scanners 70 and 80 are the same as those of FIGS. 4A and 4B. Therefore, the same reference numerals are given to the same constituent elements, and a detailed description thereof is omitted.

As shown in FIGS. 6A and 6B, in this embodiment, a switch 102 to apply a sensor actuation signal SE is provided in a sensor area 20. As in the first embodiment, a sensor control circuit 90 has an AND gate 92. A signal from the switch 102 is applied to a sensor actuation signal wire 91.

Only one switch 102 may be disposed in the sensor area 20. However, as shown in FIG. 6A, a plurality of switches 102 are disposed in the sensor area 20 and, if possible, at even intervals so that at least one of the switches 102 can be pushed down even if contact areas of a finger vary during sensing. For example, they may be disposed at the center part and at the periphery part, as shown in the figure.

As shown in FIG. 6B, the switch 102 includes a contact electrode 102b and a wire 102a. The switch 102 is disposed in an area between the unit detection elements 4. The extraction electrode 9a of the unit detection element 4 and the wire 102a of the switch 102 belong to the same layer, and the contact electrode 4b and the contact electrode 102b belong to the same layer. When any part of the sensor area 20 is pressed by a finger, the counter electrode film 2 comes into contact with the contact electrode 102b of the switch 102, and an electric current flows therethrough.

Figure 7A:
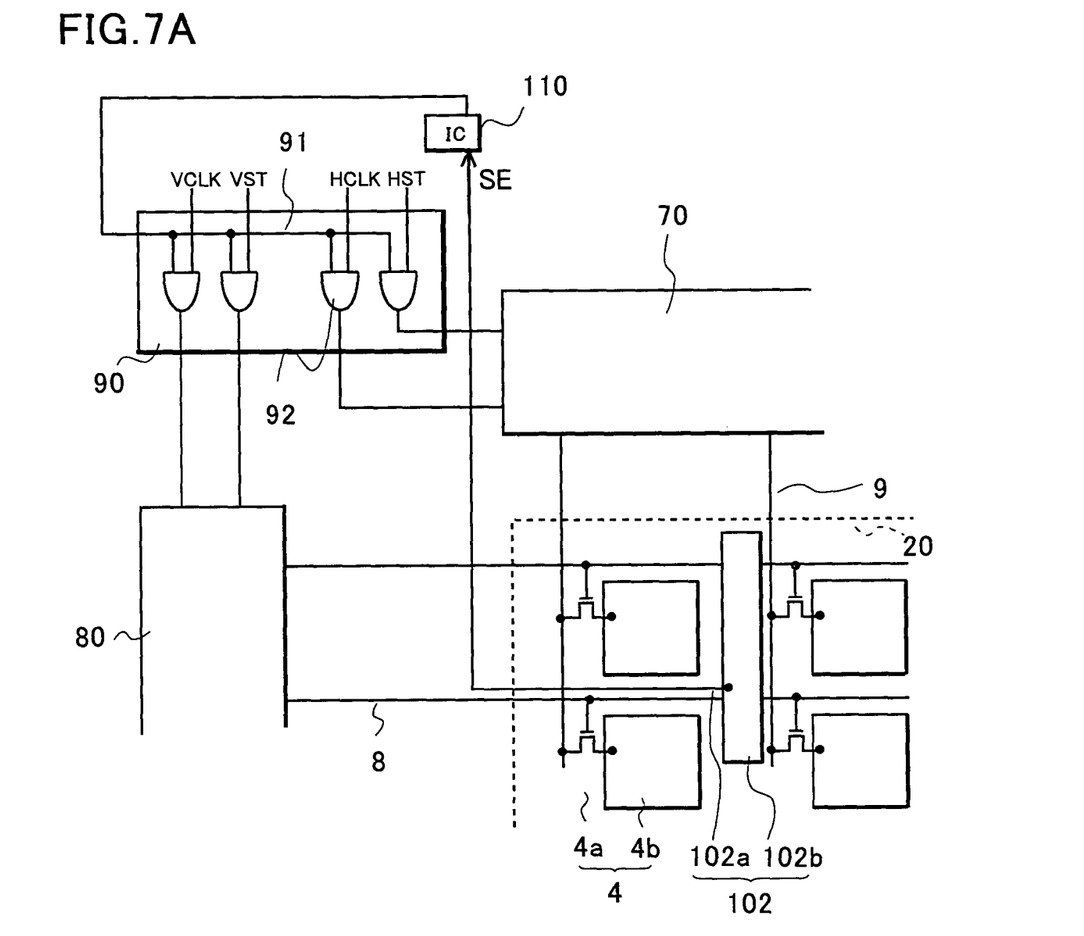
Figure 7B:
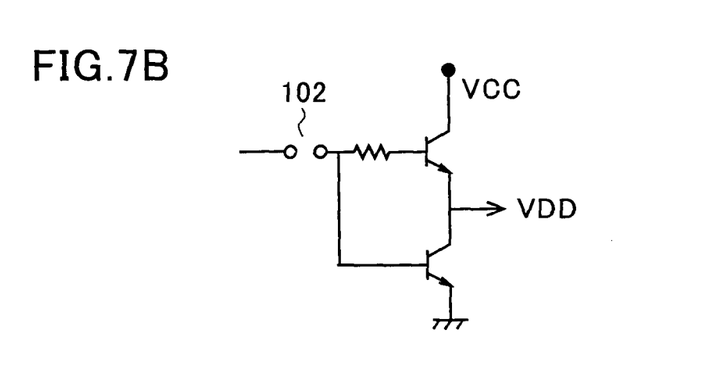
FIG. 7B is an equivalent circuit of the sensor of FIG. 6A.

Referring to FIGS. 7A and 7B, the operation of the sensor control circuit 90 in the second embodiment is described. FIG. 7A is a schematic circuit drawing, and FIG. 7B is an equivalent circuit of the part of the switch 102.

As in the first embodiment, the sensor control circuit 90 is structured as the AND gate 92. If there is no sensing during a fixed time period, an "L" level is applied to the sensor actuation signal wire 91. The H scanner 70 and V scanner 80 stop scanning and reach a standby mode as a result of the AND gate 92 operation of the control signals VCLK, VST, HCLK, HST and the sensor actuation signal SE.

During sensing, the counter electrode film 2 is reliably pressed down. When the sensor area 20 of the standby mode is pressed for sensing, one of the plurality of switches 102 placed in the sensor area 20 is pushed down. When the switch 102 comes into contact with the counter electrode film 2, the electric potential of the contact electrode 102b of the switch 102 varies, and the external IC 110 detects this. The external IC 110 outputs a sensor actuation signal SE of an "H" level to the sensor actuation signal wire 91 in accordance with the output of the switch 102. The signals VCLK, VST, HCLK, and HST are outputted through the AND gate 92, and the H scanner 70 and the V scanner 80 start a selecting operation, and the sensor area 20 enters an operation mode. In other words, a scan is driven to reach a sensing potential state substantially at the same time as an electric current flows through the switch 102. When a non-sensing state continues again for the predetermined time period, the external IC 110 outputs an "L" level, and both of the scanners are stopped.

Figure 8:
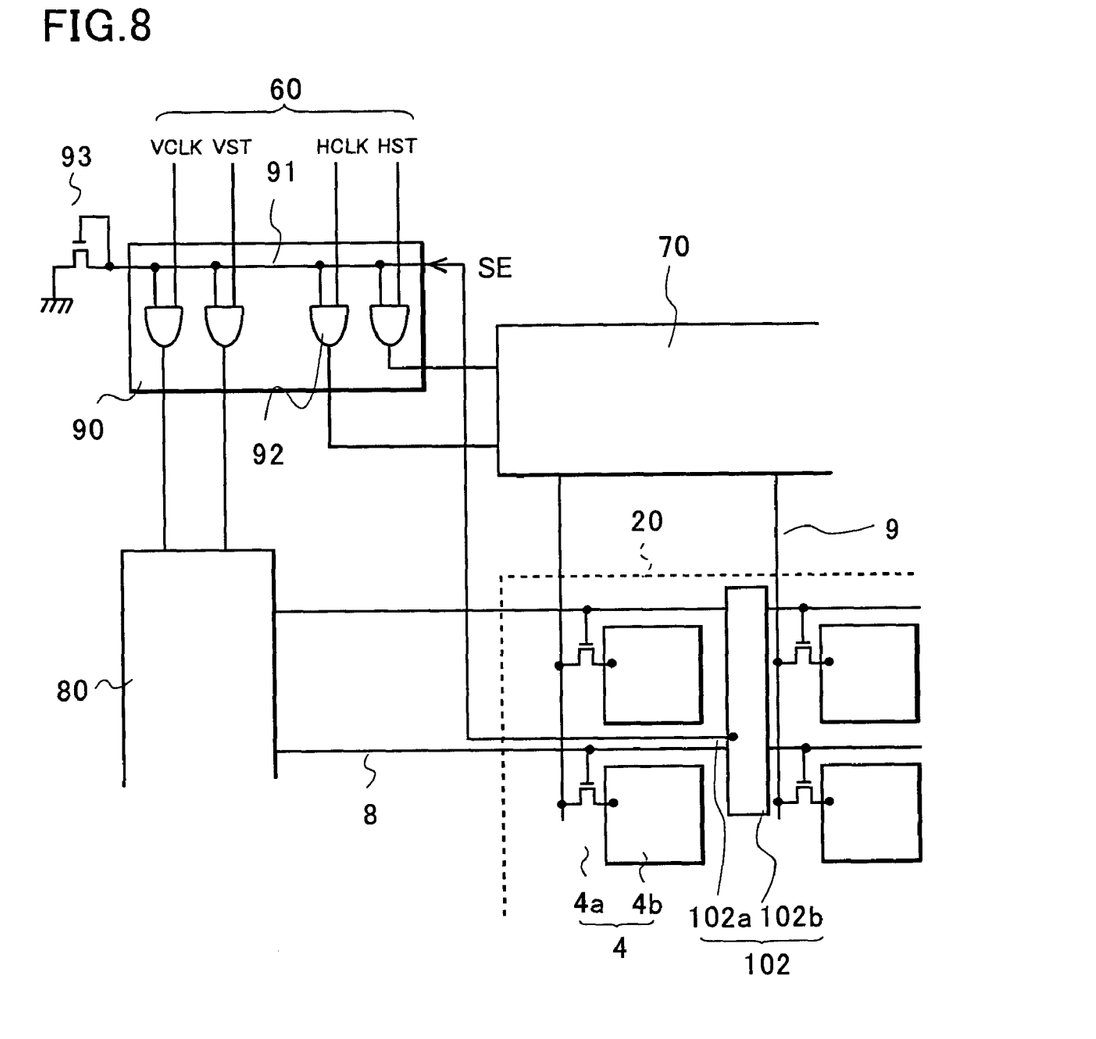
FIG. 8 is a schematic circuit of a sensor of a third embodiment of the invention.

FIG. 8 shows a third embodiment of the invention and an example of a circuit in which switching to a standby mode is automatically performed by a leak of an electric current without involving the external IC. This embodiment is the same as the second embodiment in that the switch 102 is provided, and switching is performed by the sensor actuation signal SE.

The sensor actuation signal wire 91 is further provided with a discharge transistor 93, and a wire from the switch 102 is connected to the sensor actuation signal wire 91 without involving the external IC. The sensor control circuit 90 is an AND gate of the sensor actuation signal wire 91 and the control signal wire 60. First, when the sensor area 20 is pressed during sensing, the counter electrode film 2 comes into contact with the switch 102. For example, a voltage of about 3V is applied to the counter electrode film 2. An "H" level is applied to the sensor actuation signal wire 91 by the contact, and the output of the AND gate is performed in accordance with the signals VCLK, VST, HCLK, and HST. The H scanner 70 and the V scanner 80 then perform a selecting operation, and an operation mode capable of detecting fingerprints is reached.

When a finger is separated therefrom, an electric current stops flowing through the switch 102. The electric current of the sensor actuation signal wire 91 is gradually discharged by the discharge transistor 93, and the sensor actuation signal SE becomes an "L" level. That is, since the sensor actuation signal SE becomes the "L" level, the output of the AND gate 92 is fixed at the "L" level, and the H scanner 70 and the V scanner 80 are stopped to enter a standby mode. In other words, a scan can be performed only while the film is being pressed down with a finger, and the surface-pressure distribution sensor in which an unproductive electric current is not consumed can be provided. Likewise, referring to the standby mode of the sensor area 20, when a finger is separated from the sensor area 20, switching to the standby mode can be performed by a leakage current from the discharge transistor 93 and not by the elapse of time.

Additionally, since there is no need to output a sensor actuation signal SE to the external IC 110 and again input a sensor actuation signal SE into the surface-pressure distribution sensor 2, the number of connecting pins with the external IC 110 can be reduced.

The sensor control circuit shown herein is one example. Therefore, this embodiment is not limited to the circuit shown herein if the circuit is configured to control the standby mode of the sensor control circuit 90 by a sensor actuation signal SE.

In addition to the switching of each scanner to the standby mode, the power supply to peripheral circuits, such as buffers, can also be stopped.

Figure 9A:
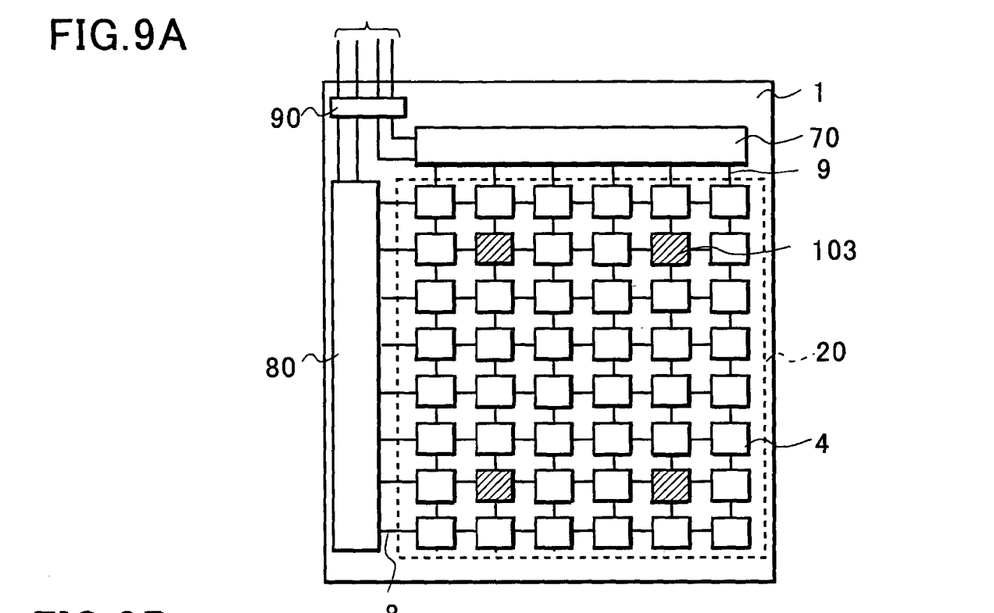
Figure 9B:
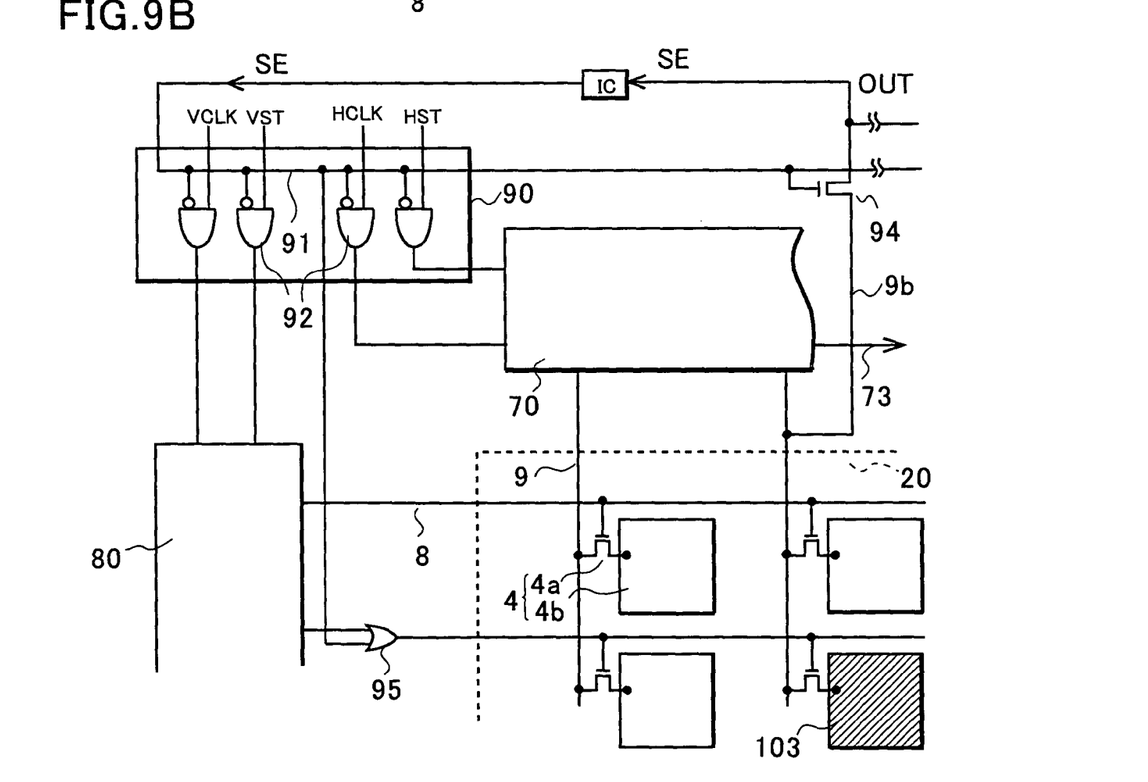
FIG. 9B is a schematic circuit view of sensor of a fourth embodiment of the invention.

FIGS. 9A and 9B show a fourth embodiment of the invention. FIG. 9A is a plan view, and FIG. 9B is a schematic circuit drawing. Since the structure of the unit detection element 4 and the structure of each scanner of the surface-pressure distribution sensor 2 are the same as those of FIGS. 4A and 4B, the same reference numerals are given to the same constituent elements, and a detailed description thereof is omitted.

As in the foregoing embodiments, a switch 103 to apply a sensor actuation signal SE to the sensor area 20 is provided in this embodiment. The sensor control circuit 90 includes an AND gate 92 of the inversion of the sensor actuation signal wire 91 and the control signal wire. A signal from the switch 103 is applied to the sensor actuation signal wire 91.

Referring to the switch 103, several of a plurality of unit detection elements 4 are used as the switch 103 as shown in FIG. 9A. A signal via a route other than the scanner is supplied to the unit detection element 4 serving as the switch 103 independently of the driving of the H scanner 70 and the V scanner 80, and continues to be constantly selected while maintaining a driving state during a standby mode. During sensing, the unit detection element 4 of the switch 103 is sequentially selected together with other unit detection elements 4, and sequentially reaches a driving state. Although the TFTs 4a of the other unit detection elements 4 are turned off by stopping the scanner during the standby mode, TFTs 4a belonging to the row of the switch 103 are always turned on during the standby because of a signal from an OR circuit (hereinafter, referred to as OR gate) 95 even if the H scanner and the V scanner are stopped.

A plurality of unit detection elements 4 serving as the switch 103 are disposed at even intervals in the sensor area 20 so that one of the switches 103 can be pushed down even if contact areas of a finger vary during sensing. For example, they may be disposed at the center part and at the periphery part as shown in the figure.

The operation will be described with reference to the schematic circuit drawing of FIG. 9B.

The drain wire 9 to which the unit detection element 4 serving as the switch 103 is connected branches off and is connected to a switch detecting transistor 94. Only the drain wire 9 to which the switch 103 is connected is shown in FIG. 9B. However, since a plurality of switches 103 are provided as shown in FIG. 9A, the drain wire 9 to which each switch 103 is connected likewise branches off and is connected to another switch detecting transistor 94. The gate of the switch detecting transistor 94 is connected to the sensor actuation signal wire 91.

The sensor control circuit 90 includes the AND gate 92 identical to that of the first embodiment. When a non-sensing state is maintained for a predetermined time period, an "H" level is applied to the sensor actuation signal wire 91 as a sensor actuation signal SE, contrary to the foregoing embodiments. The output of the AND gate 92 is fixed at an "L" level because of the AND gate 92 of the control signals VCLK, VST, HCLK, and HST and the inversion of the sensor actuation signal SE, and scanning by the H scanner 70 and the V scanner 80 are stopped to enter a standby mode.

The OR gate 95 with the sensor actuation signal wire 91 is provided at the gate wire 8 connected to the switch 103. In this embodiment, the H scanner 70 and the V scanner 80 are at the "L" level and enter the standby mode, and the sensor area 20 excluding the switch 103 is turned off when the sensor actuation signal SE is at the "H" level. Since the output from the OR gate 95 of the sensor actuation signal wire 91 is applied through the gate wire 8 to the gate of the unit detection element 4 serving as the switch 103, the TFT 4a of the switch 103 is always switched on while the sensor actuation signal SE is "H", because the sensor actuation signal SE is "H" even if the V scanner 80 is being stopped. Since the output of the OR gate 95 changes according to a gate signal when the sensor area 20 is in an ON-state (during sensing), the TFT 4a of the switch 103 is scanned in the same manner as the other unit detection elements 4.

Thereafter, when the sensor area 20 is pressed with a finger, an electric current flows through the counter electrode film 2, to which a voltage of, e.g., 3V is applied, and is outputted through a branch wire 9b from the drain wire 9 and through the switch detecting transistor 94 according to its change. As a result, the IC changes to the "L" level of the sensor actuation signal SE. A driving signal is supplied through the AND gate 92 so as to drive the H scanner 70 and the V scanner 80. While the V scanner 80 is selecting one gate wire, the H scanner 70 sequentially selects all drain wires so as to sequentially drive the unit detection elements 4, and enters an operation mode. At this time, the switch 103 is sequentially selected in the same manner as the other rows by the OR gate 95 in accordance with the scanning signal outputted by the V scanner 80, and a driving state is reached. The sensor actuation signal SE is supplied also to the gate of the switch detecting transistor 94, and the switch detecting transistor 94 is turned off at the "L" level. Even if the output of the unit detection element 4 serving as the switch 103 is performed at this time, the switch detecting transistor 94 does not open and does not operate as the switch 103. In other words, it is used as a usual unit detection element 4, and, if the mountain of a fingerprint comes into contact therewith in the operation mode, it is used as an element to detect it. Since the sensor area 20 is also scanned, the fingerprint is outputted through the data-reading wire 73 and is measured.

A plurality of unit detection elements 4 serving as the switch 103 are provided in the sensor area 20, branch from the drain wire to which they are connected and are each connected to the switch detecting transistor 94. One terminal of the switch detecting transistor 94 is united with one terminal of another switch detecting transistor 94. The reason is to detect that the sensor area 20 has been pressed by allowing an electric current to flow through any one of the plurality of switches 103.

When a certain fixed time elapses, an "H" level is applied from the external IC to the sensor actuation signal wire 91. All of the AND gates 90 become "L" by this, and the scanner enters a standby mode. The gate of the switch detecting transistor 94 becomes an "H" level, and the switch 103 starts to be monitored. When the switch 103 is pushed down to restart sensing, an electric current flows through the switch, and the information that the switch has been pushed down is outputted to "OUT". According to this signal, the IC outputs "L", and the H scanner and the V scanner restart.

A scan can be performed by pressing the sensor area with a finger in this manner, and the surface-pressure distribution sensor in which an unproductive electric current during non-sensing is not consumed can be provided only by constantly driving only the unit detection elements 4 of the switch 103.

Additionally, since a small number of unit detection elements 4 can be used as the switch, another switch does not need to be provided unlike the second and third embodiments, and a surface-pressure distribution sensor capable of reducing power consumption can be provided without changing the conventional structure of the sensor area 20.

The sensor control circuit shown herein is one example. Therefore, this embodiment is not limited to the circuit shown herein if the circuit is structured to control the standby mode of each clock by a sensor actuation signal SE.

In addition to the switching of each scanner to the standby mode, a power supply to peripheral circuits, such as buffers, can also be stopped.

What is claimed is:

1. A surface-pressure distribution sensor alternating between an operation mode and a standby mode, comprising:
    an insulating substrate;
    unit detection elements disposed on the insulating substrate in a matrix form;
    a flexible conductive film facing the unit detection elements;
    drain wires connected to corresponding terminals of the unit detection elements;
    gate wires connected to corresponding terminals of the unit detection elements;
    a horizontal scanning circuit selecting the drain wires sequentially;
    a vertical scanning circuit sending a scanning signal to the gate wires sequentially;
    a sensor control circuit connected to the horizontal scanning circuit and the vertical scanning circuit; and
    a sensor actuation signal wire connected to the sensor control circuit,
    wherein the sensor control circuit is configured to receive a sensor actuation signal through the sensor actuation signal wire and configured to switch off the unit detection elements operational under the operation mode and to switch on the unit detection elements not operational under the standby mode in response to the sensor actuation signal, and
    the sensor control circuit is configured so that during the standby mode the horizontal and vertical scanning circuits do not receive a clock that is supplied to the horizontal and vertical scanning circuits during the operation mode.

2. A surface-pressure distribution sensor alternating between an operation mode and a standby mode, comprising:
    an insulating substrate;
    unit detection elements disposed on the insulating substrate in a matrix form;
    a flexible conductive film facing the unit detection elements;
    drain wires connected to corresponding terminals of the unit detection elements;
    gate wires connected to corresponding terminals of the unit detection elements;
    a sensor area in which the unit detection elements and portions of the drain and gate wires are arranged;
    a horizontal scanning circuit selecting the drain wires sequentially;
    a vertical scanning circuit sending a scanning signal to the gate wires sequentially;
    a sensor control circuit connected to the horizontal scanning circuit and the vertical scanning circuit; and
    a switch disposed in the sensor area and configured to provide a sensor actuation signal to the sensor control circuit so that the unit detection elements not operational under the standby mode are switched on so as to operate under the operation mode,
    wherein the sensor control circuit is configured so that during the standby mode the horizontal and vertical scanning circuits do not to receive a clock that is supplied to the horizontal and vertical scanning circuits during the operation mode.

3. The surface-pressure distribution sensor of claim 2, further comprising at least one additional switch providing the actuation signal.

4. The surface-pressure distribution sensor of claim 2, further comprising a sensor actuation signal wire connected to the sensor control circuit, wherein the switch is disposed between the unit detection elements and is connected to the sensor actuation signal wire.

5. The surface-pressure distribution sensor of claim 2, wherein one of the unit detection elements is configured to serve as the switch under the standby mode.

6. A surface-pressure distribution sensor alternating between an operation mode and a standby mode, comprising:
    an insulating substrate;
    unit detection elements disposed on the insulating substrate in a matrix form;

a flexible conductive film facing the unit detection elements;

drain wires connected to corresponding terminals of the unit detection elements;

gate wires connected to corresponding terminals of the unit detection elements;

a horizontal scanning circuit selecting the drain wires sequentially;

a vertical scanning circuit sending a scanning signal to the gate wires sequentially;

a sensor control circuit connected to the horizontal scanning circuit and the vertical scanning circuit; and a sensor actuation signal wire connected to the sensor control circuit, wherein the sensor control circuit is configured to receive a sensor actuation signal through the sensor actuation signal wire and configured to switch off the unit detection elements operational under the operation mode and to switch on the unit detection elements not operational under the standby mode in response to the sensor actuation signal, and during the standby mode the horizontal and vertical scanning circuits are configured not to receive power that is supplied to the horizontal and vertical scanning circuits during the operation mode.

7. A surface-pressure distribution sensor alternating between an operation mode and a standby mode, comprising:

an insulating substrate;

unit detection elements disposed on the insulating substrate in a matrix form;

a flexible conductive film facing the unit detection elements;

drain wires connected to corresponding terminals of the unit detection elements;

gate wires connected to corresponding terminals of the unit detection elements;

a sensor area in which the unit detection elements and portions of the drain and gate wires are arranged;

a horizontal scanning circuit selecting the drain wires sequentially;

a vertical scanning circuit sending a scanning signal to the gate wires sequentially;

a sensor control circuit connected to the horizontal scanning circuit and the vertical scanning circuit; and a switch disposed in the sensor area and configured to provide a sensor actuation signal to the sensor control circuit so that the unit detection elements not operational under the standby mode are switched on so as to operate under the operation mode, wherein during the standby mode the horizontal and vertical scanning circuits are configured not to receive power that is supplied to the horizontal and vertical scanning circuits during the operation mode.

* * * * *